(12) United States Patent
Koch et al.

(10) Patent No.: US 6,748,128 B2
(45) Date of Patent: Jun. 8, 2004

(54) DEVICE FOR CHANGING THE LENGTH OF THE RUNNING PATH OF AN ELECTROMAGNETIC WAVE

(75) Inventors: Peter Koch, Lübeck (DE); Christian Scholz, Norderstedt (DE); Ralf Engelhardt, Lübeck (DE)

(73) Assignee: Medizinisches Laserzentrum Lübeck GmbH, Lübeck (DE)

( * ) Notice: Subject to any disclaimer, the term of this patent is extended or adjusted under 35 U.S.C. 154(b) by 0 days.

(21) Appl. No.: 09/910,124

(22) Filed: Jul. 20, 2001

(65) Prior Publication Data

US 2002/0126979 A1 Sep. 12, 2002

(30) Foreign Application Priority Data

Jul. 21, 2000 (DE) .......................... 100 35 833

(51) Int. Cl.$^7$ ................................. G02B 6/00
(52) U.S. Cl. ................. 385/12; 385/2; 385/3; 385/32; 385/39; 356/345; 356/350; 250/227.11; 250/227.14; 250/227.16; 250/227.19; 250/227.21
(58) Field of Search .................. 385/2, 3, 12, 32, 385/39; 356/345, 350; 250/227.11, 227.14, 227.19, 227.16, 227.21

(56) References Cited

U.S. PATENT DOCUMENTS

| | | | |
|---|---|---|---|
| 4,530,603 A | * | 7/1985 | Shaw et al. ............ 250/227.19 |
| 4,609,871 A | | 9/1986 | Bobb ..................... 324/244 |
| 4,671,659 A | | 6/1987 | Rempt et al. ............... 356/358 |
| 4,799,752 A | * | 1/1989 | Carome .................. 250/227.19 |
| 4,893,930 A | * | 1/1990 | Garrett et al. .......... 250/227.19 |
| 5,029,978 A | * | 7/1991 | Curtis et al. .................. 385/3 |
| 5,101,449 A | * | 3/1992 | Takeuchi et al. ........ 250/227.11 |
| 5,237,632 A | * | 8/1993 | Henning ....................... 385/13 |
| 5,321,501 A | * | 6/1994 | Swanson et al. ........ 250/227.27 |
| 5,493,623 A | * | 2/1996 | Frische et al. ............... 264/1.1 |
| 5,552,887 A | * | 9/1996 | Dyott .......................... 242/470 |
| 5,559,908 A | * | 9/1996 | August et al. .......... 250/227.16 |
| 5,625,724 A | * | 4/1997 | Frederick et al. ....... 250/227.11 |
| 5,867,268 A | * | 2/1999 | Gelikonov et al. .......... 356/477 |

FOREIGN PATENT DOCUMENTS

JP         600 63 517    *  4/1985    .................... 385/3

* cited by examiner

*Primary Examiner*—Brian Healy
*Assistant Examiner*—Daniel J Petkovsek
(74) *Attorney, Agent, or Firm*—Cohen, Pontani, Lieberman & Pavane

(57) ABSTRACT

The device serves for changing the length of a running path of an electromagnetic wave. It comprises a wave guide which is wound onto a core. The core is formed in two parts, wherein the distance of the core parts to one another is changeable in order to extend the wave length in a defined manner.

14 Claims, 2 Drawing Sheets

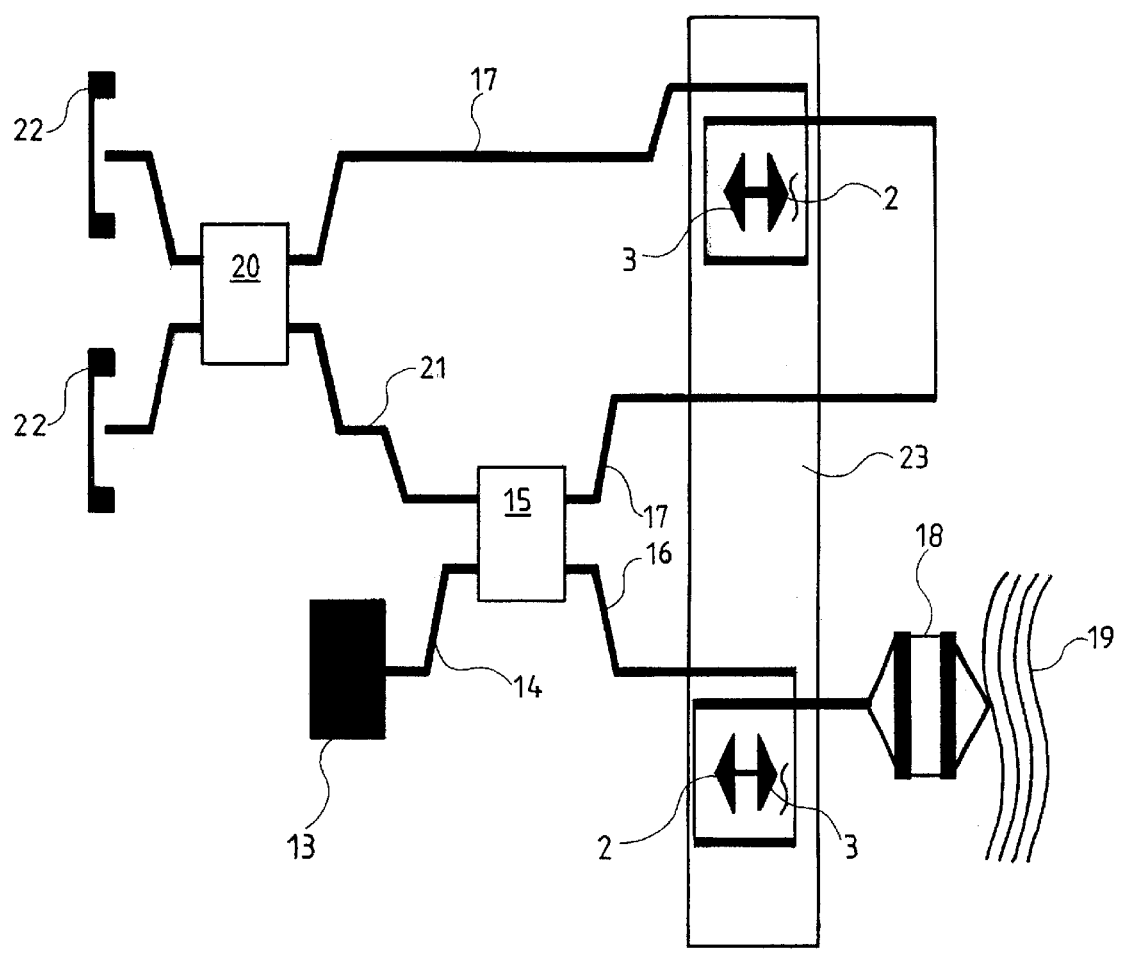

DEVICE FOR CHANGING THE LENGTH OF THE RUNNING PATH OF AN ELECTROMAGNETIC WAVE

BACKGROUND OF THE INVENTION

The invention relates to a device for changing the length of a running path of an electromagnetic wave according to the features specified in the introductory part of claim 1.

Devices of this type are known and serve for the running time change of an electromagnetic wave, in particular a light beam, for producing a Doppler shift, for producing a time-dependent spectrum. They are applied for example with optical coherence tomography (OCT), in fiber gyroscopes or also with Fourier transform spectroscopy. Such devices may be applied everywhere where it is necessary to change the optical path length of a beam path.

Known devices function either with mirror arrrangements or also as discussed here with a wave guide, in particular a quartz fiber whose length is changed by extending the guide or the fiber.

In the U.S. Pat. No. 5,321,501 there is described an apparatus for optical coherence tomography which contains such a device. This device comprises a fiber-optic wave guide which is wound around a piezoelement which extends on application of an electric current, by which means the wave guide wound thereon also extends, by which means the running path of the light changes. A disadvantage of the devices described there is that the extension of the fiber optic guide effected on account of the piezoelectric extension is not effected in a defined manner and is in several axes, by which means double refraction induced by voltage may occur, which leads to an adulteration of the results. Furthermore the device described here in dynamic operation tends to partially oscillate, which questions its usability.

From JP 600 63 517 there is known a similar phase modulator with which piezoelectric elements are arranged at four sides of an essentially cylindrical body which are activatable simultaneously. With this arrangement although a comparatively high extension may be achieved, however the extension is effected in an undefined manner an in several axes, so that the previously mentioned disadvantages are also given here.

The problem of the partial oscillations has been recognised. In U.S. Pat. No. 5,101,449 there is met an arrangement with which in the piezoelement eccentrically there is provided a recess in order to reduce these disadvantageous effects. Also from U.S. Pat. No. 5,493,623 there is known a device which is to avoid these effects, in particular the susceptibility to resonances.

In U.S. Pat. No. 5,867,268 there is described an apparatus for optical coherence tomography with which a light wave guide is adhesed onto a disk-shaped piezoelement in a spiral-shaped manner. From U.S. Pat. No. 5,029,978 there is known a device with which the light wave guide is cast into a piezoelectrically active polymer. In U.S. Pat. No. 5,135,295 there is described the coating of an optical fiber with piezoelectrically active material in order in this manner to be able to stretch the fiber practically directly.

Common to all previously mentioned devices is the fact that the optical phase shifting is changed via a voltage applied to the piezoelement. The voltage applied to the piezoeelement is however only proportional to its length changes in the first approximation since piezoelements on acount of the system have a non-linear extension behaviour. With a dynamic activation, i.e. with an activation with a periodically changing voltage, piezoelements at certain intrinsic frequencies tend to resonate. With certain applications for optical phase modulators it is necessary to know the exact path length change of the phase modulator in order to empirically compensate the non-linear behaviour of the piezoelements or to be able to construct a control loop in order to create the desired path change.

BRIEF SUMMARY OF THE INVENTION

Against this state of the art it is the object of the invention to design a device of the known type such that the previously mentioned disadvantages are largely avoided and that in particular a defined path length change is achievable which where appropriate may also be recorded with regard to measuring technology.

This object is achieved according to the invention by the features specified in claim 1. Advantageous embodiments are to be deduced from the dependent claims, the subsequent description and the drawings.

The basic concept of the present invention is to create the extension of the wave guide only where this runs essentially in a straight line in order to ensure a defined length change whilst avoiding the initially mentioned disadvantages. The wave guide is with this wound up on a divided multi-part core and the length change is effected by distance change of the core parts to one another. In the simplest form this may be effected in that the core is formed of two halves whose distance to one another is changeable. In this manner it is possible to impinge the wave guide in its straight-lined sections between these halves almost exclusively with tensile forces in order to achieve a defined length change. At the same time there may be applied practically any drive for the extension. A measuring of the length change is also possible without further ado in that the distance change of the halves to one another is determined.

Basically it is conceivable to pivot the halves or core parts to one another about an axis in order by way of this to create a position change. Preferably the position change however is effected by way of a linear displacement of the core parts to one another since then it may be ensured that with a suitable arrangement of the windings as well as design of the cores, exclusively tensile stresses are exerted onto the wave guide. By way of this one may avoid the voltage induced double refractions which are otherwise so disadvantageous. At the same time it is basically of no importance whether both core parts or several core parts are moved to one another or also whether only one core part is moved from the other or from the remaining core parts. The extension may at the same time be effected by way of a piezoelement, by way of a stack of piezoelements, electromagnetically, electromotorically (with an eccentric drive) or with another suitable drive, without departing from the concept according to the invention.

In order to produce chiefly tensile stresses in the wave guide it is useful to correspondingly mount the core part to be moved or the core parts to be moved. This may for example be effected by a linear guide, e.g. a rolling bearing guide, by way of a sliding bearing guide or also by way of a pneumatic or hydraulic guide. Advantageously here also a solid body joint may be applied, for example a parallel leaf spring guide.

It is particularly useful when the core comprises sections along which the wave guide runs curved and other sections along which the wave guide runs essentially in a straight line, and the wave guide in the regions in which it runs curved are fixedly adhesed on the associated core section or is fastened with a material or friction fit in another suitable manner so that it is ensured that in these regions there is effected no or only a very slight relative movement between the core and the wave guide, but only in the regions in which the wave guide runs in a straight line. In the latter regions the wave guide should bear preferably not directly and if so then only with as small as possible coefficient of friction, in order not to introduce any transverse forces with the tensile stresses. On the other hand such a supporting of the sections of the wave guide which run essentialy in a straight line brings with it considerable advantages, in particular in the dynamic operation, since then an uncontrolled oscillation of the wave guide in these regions may be prevented.

It is particularly advantageous when the core sections in which the wave guide runs curved are formed by halves of a cylindrical body which is divided along its axis. In the remaining region between these cylinder halves there are usefully provided guides which prevent or at least dampen transverse oscillations of the wave guide.

With the device according to the invention preferably also a piezoelement or a stack of piezoelements may be applied as a drive, since the non-linear behaviour may either be compensated by a suitable control or by way of measuring technology. For this, parallel to the drive, e.g. between the core sections movable to one another there is to be provided a recording device, preferably a capacitive recorder. However also according to the type and the scope of the extensions any other recording device, e.g. wire strain gauge or inductive recorder may be applied.

As wave guides advantageously quartz fibers may be applied, wherein according to the demands, protective-coated or also non-protective-coated quartz fibers may be used. Such quartz fibers are inexpensive to manufacture and may be elastically extended up to 10% so that already with a low winding number there may be achieved large length changes. Preferably the winding is effected in one layer, however also multi-layered windings may be provided, when it is ensured that the wave guide is fixed in the region of its curved sections, in order to avoid multi-axis initiations of tension.

Preferably the device comprises a control which in dependence on the signal emitted from the distance recorder (recording device) controls drive elements determining the distance of the core parts so that the length change of the running path is changeable in a directed manner, in particular also in dependence on time. In this manner the length change may be effected according to a pregiven speed or path profile.

With the application of a piezoelement as a drive it may be advantageous to operate this in the resonance region, since then the force development, i.e. thus the efficiency is particularly high. Furthermore the device in this region functions in a very frequency-stable manner.

A preferred application purpose of the device according to the invention is with Fourier transfrom spectroscopy, and specifically in the sample branch. Also the device may be applied as a phase modulator selectively in the reference or in the sample branch of an interferometer which is applied with optical coherence tomography. Such an interferometric measuring arrangement may for example comprise two coupling means wherein in a first coupling means the light waves coming from a light source are coupled into a sample arm and a reference arm and in the second coupling means the light waves coming from the reference arm as well as the light waves coming from the sample arm are superimposed and led to at least one, preferably two detectors which convert the optical interference into an electric signal. With this arrangement the reference arm is formed by a fiber guide extending between the coupling means. The sample arm comprises preferably at least two fiber guides which extend to both sides of the first coupling means. Such an arrangement is particularly strong in light and on account of its construction (guiding of the light waves almost exclusively in fiber guides) is largely insensitive to external surrounding influences. Via the free end of the sample arm furthermore the topology of an external object may be covered, as is for example effected with Fourier transform spectroscopy. Advantageously the device according to the invention is applied in the sample branch as well as in the reference branch of an interferometer, wherein one device serves the dynamic path length change of the light and the other for the static setting of the operating point. With this in an advantageous embodiment of the invention both devices may be thermally connected to one another, for example by way of a heat-conducting common carrier frame, by which means it is ensured that also with a changing operating temperature there is effected no displacement of the operating point outwardly appearing, or a corresponding displacement is effected also in the other branch which compensates this.

On account of the defined length change or the simple recordability of the length change the device according to the invention may be applied in many fields, for example for field strength measurement whilst exploiting the electrostrictive effect.

BRIEF DESCRIPTION OF THE DRAWINGS

The invention is hereinafter described in more detail by way of an embodiment example shown in the drawing. There are shown in.

DETAILED DESCRIPTION OF THE INVENTION

Figure 1:
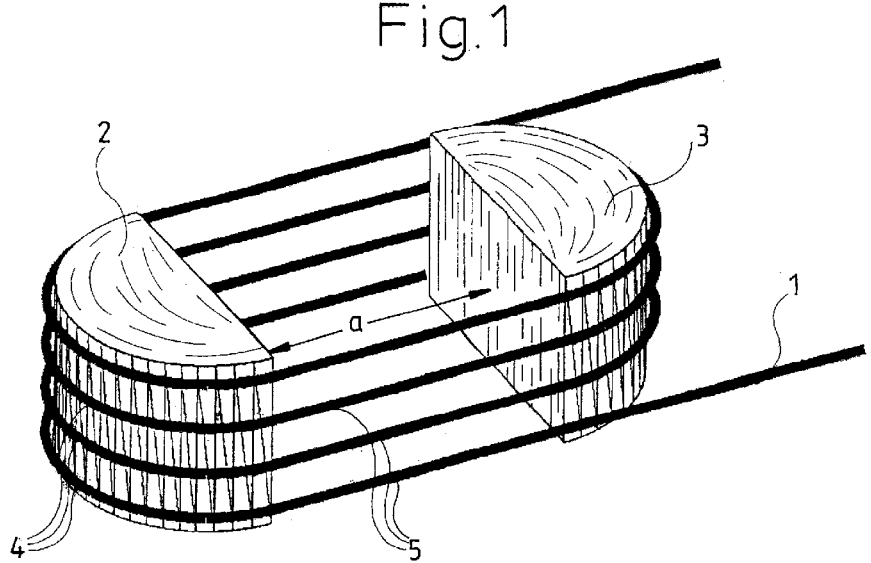
FIG. 1 in a greatly simplified schematic representation the principle of the present invention, FIG. 2 in a perspective representation one embodiment example of a device according to the invention and FIG. 3 in a schematic principle representation, the use of the device according to the invention with an interferometer.

As the principle representation according to FIG. 1 illustrates, a wave guide 1 in the form of a quartz fiber is wound onto a core consisting of two parts 2 and 3, whose distance a is changeable by way of a drive which is not shown. The core parts 2 and 3 in each case form the halves of a cylindrical body so that the wave guide 1 comprises curved sections 4, with which it bears on the core, as well as essentially straight-lined running sections 5, which are formed between the core parts 2 and 3. With this the wave guide 1 with its ends is fixed and furthermore in the region of the curved sections 4 connected to the core parts 2 and 3 such that by way of a change of the distance a only the straight-lined running sections 5 of the wave guide 1 are loaded and unloaded with tension. The wave guide is wound on the core with pretension so that it is ensured that the straight-lined sections 5 are constantly tensioned. If then the distance a between the core parts 2 and 3 is increased by a length $\Delta a$, the wave guide 1 follows this movement by extension of the straight-lined sections 5. With the example described by way of FIG. 1 with which the wave guide 1 is wound in four windings, there results thus a length change of the wave guide 1 which corresponds to the distance change $\Delta a$ multiplied by twice the winding number (doubling since the straight-lined sections 5 in each winding are present twice), in the present case thus eight times the distance change Δa. With the use of commercially available quartz fibers as wave guides a multitude of windings may be wound onto the core so that a very considerable length change of the wave guide 1 is already given when one only slightly changes the distance of the core parts 2 and 3.

In order for example to achieve a wavelength change of 2 mm demanded for optical coherence tomography a distance change of the core parts 2 and 3 of 45$\mu$ is sufficient when the distance a is 80 mm and there are provided 23 windings. If one assumes a core diamter of 30 mm then there results a total length of the wave guide 1 of 5.50 m.

Figure 2:
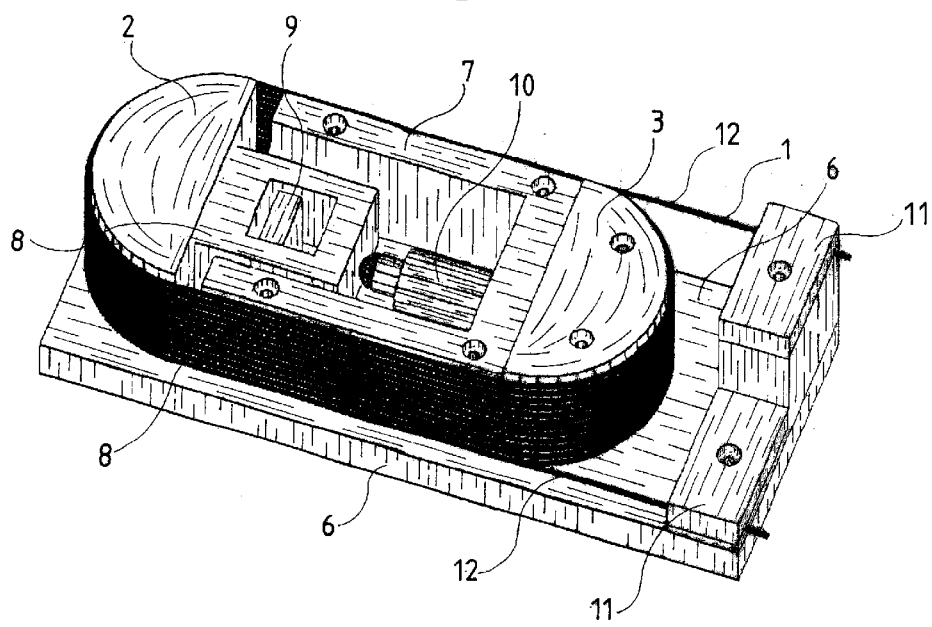

With the embodiment example shown in FIG. 2 such a device is constructed on a base plate 6. Rigidly connected to the base plate is a core part 3, whereas the left core part 2 in FIG. 2 via a solid body joint which is not shown is arranged linearly displaceable on the base plate 6. The core parts 2 and 3 have as with the principle representation according to FIG. 1 semi-cylindrical shapes, however to the core part 3 there connects a guide part 7 which in a plan view is u-shaped and which guides the straight-lined sections 5 of the wave guide 1 designed in the form of a quartz fiber. This guide part 7 bears with a small play on these sections 5 and is to prevent these in dynamic operation from oscillating transverse to the direction of the distance change. The guide part 7 may however also bear on the straight-lined sections of the quartz fiber in a friction adhesed manner in order to effect an increased damping in a directed manner. The core parts 3 and 7 are fastened on the base plate 6 by way of screws which are not shown.

To the left semi-cylindrical core part 2 there connects a parallelpiped part 8 which inwardly projects into the guide part 7 and is part of a capacitative path measuring means between the movable part 8 and a stationary component 9.

Between the core parts 2 and 3 there is provided a piezoelectric element 10 as a drive which is supported on the one hand on the inner side of the guide part 7 as well as on the opposite side of the parallelpiped part 8 on the other hand. The piezoelectric element 10 may be constrcuted on several individual elements arranged behind one another or in parallel.

The quartz fiber 1 is wound as one layer over the core 2, 3, 7, wherein the quartz fiber 1 in the region of its curved sections 4 rigidly bears on the core parts 2 and 3, whereas in the region of the straight-lined sections 5 there exists a loose bearing on the sides of the guide part 7 so that the quartz fibers in these straight-lined sections 5 extend freely and may also again contract. At the end side the quartz fiber 1 is fixed, and specifically by way of two clamping plates which are connected to the base plate 6. The winding is effected with pretension.

As soon as the piezoelectric element 10 is impinged with voltage, this extends in the direction of the axis, by which means the core parts 2 and 3 are moved away from one another (distance change Δa), by which means there is effected an extension of the straight-lined sections 5 of the quartz fiber. Since the movement, i.e. the temporal course of the distance change is recorded by way of the path measuring means 8, 9, by way of a control which is not described in detail here, the piezoelectric element 10 is activated such that a predetermined path or speed profile is produced. In each case the distance change Δa and thus the length change of the quartz fiber 1 may be exactly determined. The return movement of the movable part 3 is effected on the one hand via the spring effect of the solid body joint and on the other hand via the restoring force of the quartz fiber 1. The device is in particular also suitable for dynamic operation, the piezoelectric element 10 for this is excited with a frequency in the region of the intrinsic frequency.

By way of FIG. 3 it is shown how the previously described device may be applied in an interferometric measuring arrangement. This arrangement consists of a light source 13 in the form of a laser, whose light is fed into a quartz fiber 14 which opens into a first coupling means 15 and here is led into a quartz fiber 16 as well as a quartz fiber 17. The quartz fiber 16 forms part of the sample branch of the interferometric measuring arrangement and similar to the embodiment described in FIG. 2 is wound on two core parts 2 and 3 which are movable to one another and whose distance to one another is changeable. The end of the quartz fiber 16 opens into an optical lens arrangement 18 which is arranged at a distance to a sample 19 to be examined.

The quartz fiber 17 is likewise wound on a core whose core parts 2 and 3 in their distance are adjustable to one another. The quartz fiber 17 forms the reference branch of the interferometric measuring arrangement. Via the distance change of the core parts 2 and 3 the operating point of the arrangement may be set. The quartz fiber 17 opens into a second coupling means 20 in which there also opens a quartz fiber 21 which comes from the first coupling means 15 and which leads further the light reflected from the quartz fiber 16 from the sample 19 which within the second coupling means 20 superimposes with the light of the reference branch coming from the glass fiber 17, thus finally of the light source 13. The exit of the second coupling means 20 is provided with two detectors 22 (light intensity/current transducer), via which then the electrical evaluation of the optical signals is effected.

Whilst the core parts 2 and 3 on which the quartz fiber 17 is wound are only changeable in distance for setting the operating point, the core parts 2 and 3 on which the quartz fiber 16 is wound comprise a drive as is shown by way of FIG. 2. Since the light runs through the glass fibers 16 on way to the probe 19 as well as on the way back, each distance change of the core parts 2 and 3 irrespective of the winding number is multiplied additionally by the factor 2.

A particularity of the arrangement shown in FIG. 3 is a heat conducting plate 23 with which the core parts 2 and 3 as well as the quartz fiber 16 and the quartz fiber 17 are connected in a heat-conducting manner. Such a heat-conducting connection of the core parts 2 and 3 may also be created by other suitable measures and has the advantageous effect that the measuring arrangement functions practically independent of temperature, since a length change of the quartz fiber 17 caused by temperature also effects such of the quartz fiber 16, assuming the same length and winding numbers.

What is claimed is:

1. A device for changing the length of the running path of an electromagnetic wave, comprising a wave guide in which the electromagnetic wave is led and a multi-part core consisting of two core parts on which the wave guide is wound, the length change of the wave guide being effected by extension of the wave guide wound on the core in that a change in position of the core parts to one another is effected, wherein the wave guide in sections is led essentially in a straight line and that the extension is effected essentially only in these straight-lined sections of the wave guide, and at least one piezoelement is arranged between the core parts and operated in the resonance region for producing the position change.

2. A device according to claim 1, wherein the core comprises sections along which the wave guide is curved and section along which the wave guide runs essentially in a straight line, wherein the first sections form part of a cylindrical body split along its axis.

3. A device according to claim 1, characterized in that between the core parts there is provided at least one capacitive distance recorder for detecting the length change.

4. A device according to claim 1, wherein the mechanical guiding at least of one art of the cores is effected by way of a solid body joint.

5. A device according to claim 1, wherein the wave guide in the sections in which it runs essentially in a straight line and experiences its length change is provided with means for oscillation damping, which in particular bears in a damping manner on the straight-lined running core sections.

6. A device according to claim 1, wherein the wave guide is a quartz fiber.

7. A device according to claim 1, wherein the wave guide over its whole winding length is supported on the core and wherein there are provided means which increase the friction between the wave guide and the core in the regions of the curved surfaces with respect to the regions in which the wave guide runs essentially in a straight line.

8. A device according to claim 1, wherein there is provided a control which controls the control element determining the distance of the core parts in dependence on the signal delivered by the distance recorder.

9. A device according to claim 1, wherein the length change $\Delta a$ is effected according to a pregiven speed or distance profile.

10. A device according to claim 1, wherein it is used with Fourier transform spectroscopy in the sample branch.

11. A device according to claim 1, wherein it is used for field strength measurement whilst exploiting the electrostrictive effect.

12. A device according to claim 1, wherein it is used as a phase modulator in the reference and/or sample branch of the interferometer used in optical coherence tomography (OCT).

13. A device according to claim 1, wherein it is provided in the reference branch and in the sample branch, wherein both devices are connected to one another in a heat conducting manner.

14. A device according to claim 1, wherein the at least one piezoelement is operated in the resonance region for producing the position change.

* * * * *